United States Patent [19]

Scott

[11] Patent Number: 5,563,987
[45] Date of Patent: Oct. 8, 1996

[54] PAGEMAP MEMORY REPRESENTATION IN RISC PROCESSOR PRINTERS

[75] Inventor: Steven M. Scott, Lafayette, Colo.

[73] Assignee: International Business Machines Corporation, Armonk, N.Y.

[21] Appl. No.: 330,943

[22] Filed: Oct. 28, 1994

[51] Int. Cl.⁶ ................................................. G06K 15/00
[52] U.S. Cl. .......................................... 395/115; 395/116
[58] Field of Search ................................. 395/115, 116, 395/110, 164, 165, 166, 250, 150, 151, 108; 358/404, 444, 261.4

[56] References Cited

U.S. PATENT DOCUMENTS

| 3,944,989 | 3/1976 | Yamada | 395/166 |
| 4,300,206 | 11/1981 | Belleson et al. | 395/147 |
| 4,825,386 | 4/1989 | Bogacki | 395/116 |
| 5,084,831 | 1/1992 | Morikawa et al. | 395/116 |
| 5,163,123 | 11/1992 | Kadono | 395/116 |

OTHER PUBLICATIONS

AFP Application Programming Interface Programming Guide and Reference Release 1.0 (S544–3872–00.

Primary Examiner—Arthur G. Evans
Attorney, Agent, or Firm—William J. Dick; Saul A. Seinberg

[57] ABSTRACT

Disclosed is a process and apparatus for pagemap memory representation in RISC controlled printers. The technique disclosed optimizes pagemaps in memory to minimize losses in processor efficiency of processors having data caches, TLB's and virtual memory, due to unavailability of desired data in first the data cache, then the random access memory. The technique is particularly applicable to RISC processors having a plurality of table lookaside buffers, each containing the address of a frame or page of memory, each frame comprising a finite number of bytes of data. This is accomplished by dividing the pagemap into one dimensional array of swaths of scans, each swath containing a two dimensional array of words in column major order. Each of said swaths having a height measured in scans which is a function of frame size, data cache line size and set associativity of the data cache, but which is an integral multiple of the number of words in a data cache line. The optimization of set associativity of data cache line utilization is accomplished by determining that the swath height divided by the number of words in a data cache line are not evenly divided by two.

22 Claims, 7 Drawing Sheets

PAGEMAP MEMORY REPRESENTATION IN RISC PROCESSOR PRINTERS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a method and apparatus for optimizing pagemaps in memory for printing and more particularly relates to a novel method of organizing the bit map presentation of the pagemap in memory of a RISC architectured processor utilized in conjunction with a high speed printer.

2. Description of the Related Art

The example system considered in this application is an IBM (International Business Machines Corporation) RISC (Reduced Instruction Set Computer) System/6000 processor controlling a print engine such as employed in the IBM Model 3900D Fanfold Duplex Printer. This is a high throughput (300 pages/minute) system printer. However, it should be understood that the novel method of organizing the bit map presentation of the pagemap in memory is applicable, with obvious modifications, to other RISC architecture processors being utilized for either printing or other applications requiring high throughput.

Many high speed printers use a Printer Control Unit for printing with custom hardware and logic for building a pagemap. Traditionally, for special jobs they work very fast when merging (OR'ing) data into the pagemap. (Called BitBLT, or Bit BLock Transfer.) Because of the turn-around-time in the design and implementation of custom hardware, it would be preferable to build the pagemap solely by use of the processing power of the RISC processor. This means that design changes and differing functional results may be implemented and tested in a far shorter time than with more traditional, custom hardware implementations. However, even with the power of a RISC architecture processor, performance can degrade seriously in special situations such as Advanced Function printing control. (The Advanced Function Presentation interface, which is employed when writing applications for the above-identified printer, is fully described in "AFP Application Programming Interface Programming Guide and Reference", and available as publication S544-3872-00, with the above title, from International Business Machines Corporation.)

The problem is exacerbated when the application has to access large amounts of memory in a random or pseudo-random manner. For example in printing, a pagemap requires access to large amounts of memory where the pagemap contains a binary bit image (bit map) representing the page. As an example, assuming a resolution of 300 dpi (drops or dots per inch), (110 dots/cm) and a pagemap representing an 8.5 by 11 inch printed page, (21.6 by ∞28 cm), and 1 drop=dot=1 bit, then 8.5 times 300 times 11 times 300=8,415,000 bits or/8=greater than 1 mega-byte (1 MB) of memory. Moreover, if the resolution doubles, i.e., increases to 600 dpi, memory usage quadruples. This means a pagemap consumes over 4 MB of memory.

With the RISC System/6000 processor architecture (which along with memory will be discussed more fully hereinafter), whenever data is not available in a "layer" of memory, additional cycles of processor time are expended until the necessary or called for data is fetched for processing. For example, if the processor calls for data from the cache, one cycle is expended, if the data is not in the cache and must be retrieved from memory, then anywhere from 10 to 100 cycles of processor time may be expended. If the information must be retrieved from disk to memory, to cache to processor, then tens of thousands of cycles may be expended. Moreover, if this situation occurs often, thrashing occurs and the situation gets worse. (Thrashing can either occur between cache and memory or memory and disk. In either case, the processor is unable do useful work because it must wait until the data is loaded from a lower level of storage.) Many applications easily avoid this problem because of the nature of the data they manipulate. For example, the matrices used during matrix multiplication can be extremely large. By transforming one of the matrices from row major order to column major order allows the program to be written so that the memory is accessed sequentially. Sequential access is the fastest way to access memory using present day RISC processors.

So how should the pagemap be represented in memory? As a first way, a two dimensional array in row major order could be employed, which is the best organization for processors without data cache or virtual memory. This approach works well for processing data that runs horizontal to the pagemap; e.g., horizontal rows of text. However, if the rows of text happen to run vertical to the pagemap, there isn't enough data cache for more than an inch of text because the cache "lines" run perpendicular to the row of text. (Cache lines, which will be discussed later, run horizontally relative to a pagemap in row-major order.) Moreover, lines of text that extend from top to bottom of the page would suffer a data cache miss for ever single word load of the pagemap. In this kind of situation, the data cache misses cost about 18–20 cycles loss in processor time to effect a reload. This kind of performance degradation is substantial. (In certain models of the RISC System/6000, a data cache miss takes about 8 to 9 cycles if the cache line selected for replacement is "clean"; i.e., the cache line doesn't need to be written back to memory. It takes about 18 to 20 cycles if the cache line is "dirty". Since data is being accessed down the page, most cache lines are going to be "dirty"; i.e., contain data that needs to be written to memory before new data is loaded.)

The next best approach is to organize the pagemap as a two-dimensional array of words in column major order. With this approach, the words of memory are addressed sequentially down the page, rather than across the page. (This is the preferred organization for processors with data cache, but with no virtual memory.) As may be imagined, this approach works well for processing lines of text that are vertical to the pagemap, and with a sufficiently large number of Table look aside buffers TLB's, this approach would also work well for processing horizontal data.

(While TLB's will be discussed later in the section of this specification where memory organization is discussed, suffice at this time that the TLB entries point to the page numbers of recently-referenced virtual memory pages which have been loaded into real memory.)

Unfortunately, there are only enough TLB's to address a small fraction of the pagemap. As a result, when processing data that lays horizontal to the pagemap, a TLB miss will occur each time a new column of words is accessed. Every TLB miss can cost up to 100 cycles of lost processor time. Assuming that the width of the pagemap is about 11 inches by 300 dpi or 3300 pels or bits, then 3300/bits per word (32)=104 columns of data with each column of data being addressed by a different TLB. If the processor has only 64 TLB's (common for many RISC System/6000 models), then a TLB miss occurs every time for the next column because the TLB's are replaced on an approximation of a Least Recently Used (LRU) basis. The problem is worse for wider pagemaps and higher resolutions.

The problem in the processor is caused by a limitation of processor data cache available and Translation Lookaside Buffers (TLB's). For example, most models of the RISC System/6000 have 8 to 64 KB (kilo bytes) of L1 cache (highest level of cache memory) memory, and only 64 to 128 TLB entries capable of addressing respectively 256 to 512 KB's of virtual memory simultaneously. Thus, it is not possible to address an entire pagemap (1 to 4 MB of memory) simultaneously with only 64 to 128 TLB entries.

In certain of the prior art methods of printing pagemaps comprising bit images, U.S. Pat. No. 5,084,831, Jan. 28, 1992, to Morikawa et al describes a printing method in which a full bit map mode is employed for storing a page of data, and a secondary mode for a smaller quantity of data is illustrated. The selection of the strip map (secondary mode) or page mode is selected in accordance with the size of image data. In the strip map mode, the output of band buffers is alternately fed to the print engine, while one is printing the other is loading until the entire page is fully printed. (See col. 8 and FIG. 11.) There is no teaching of bit map data structure, nor how to account for data caching problems in a very high speed printer.

In U.S. Pat. 5,163,123 issued on Nov. 10, 1992, there is shown a printer having a bit map memory for storing dot image data corresponding to image data of one page sent from an external apparatus. In this scheme, a buffer memory is employed intermediate the bit map memory and the image forming means, such as a printhead. The writing means utilized takes the data from the bit map memory one scan at a time for reading into the buffer memory and outputs to the printhead at the same rate in response to a start signal from a signal generator. Since the buffer memory (which could be equated to cache memory even though it is DRAM, as set forth in the text of the patent), is outputted one scan at a time, there is no recognition of the problems outlined above and as resolved by the present invention, including data cache misses, etc., and special arrangement of the pagemap to help avoid the problem when data is fed to the print engine.

In U.S. Pat. 4,825,386, issued on Apr. 25, 1989 to Bogacki, there is disclosed a horizontal line processor of data to be printed out dot sequentially. Here, the horizontal line processor loads print instruction commands into selected locations in a full page bit map memory. However, there is nothing indicating the desired structure of the bit map memory to alleviate the problems alluded to heretofore.

SUMMARY OF THE INVENTION

In view of the above, it is a principal object of the present invention to optimize pagemap organization in memory to minimize loss of efficiency in RISC processors having data caches and the ability to address virtual memory.

Another object of the present invention is to present a pagemap memory organization that is best implemented in a manner which is easily modified to optimize printer output.

The present invention optimizes pagemaps in memory to minimize losses in processor efficiency of RISC Processors having data caches and virtual memory. The pagemap organization improves overall performance by reducing the number of data cache and TLB misses. The invention is particularly applicable to RISC processors having a plurality of table lookaside buffers, each containing the address of a frame or page of memory, each frame comprising a finite number of bytes of data. This is accomplished by dividing the pagemap into one-dimensional swaths of scans, each swath containing a two-dimensional array of words in column major order. Each of said swaths having a height measured in scans which is a function of frame size, data cache line size and set associativity of the data cache, but which is an integral multiple of the number of words in a data cache line. The optimization of set associativity of data cache line utilization is accomplished by determining that the swath height divided by the number of words in a data cache line are not evenly divided by two.

Other objects and a more complete understanding of the invention may be had by referring to the following description taken in conjunction with the accompanying drawings.

DETAILED DESCRIPTION OF THE PREFERRED EMBODIMENT

Prior to describing the preferred pagemap memory organization of the present invention, it is preferable that a basic understanding be had of the architecture and memory organization of a RISC processor. These are described below.

RISC SYSTEM 6000/ARCHITECTURE

Figure 1:
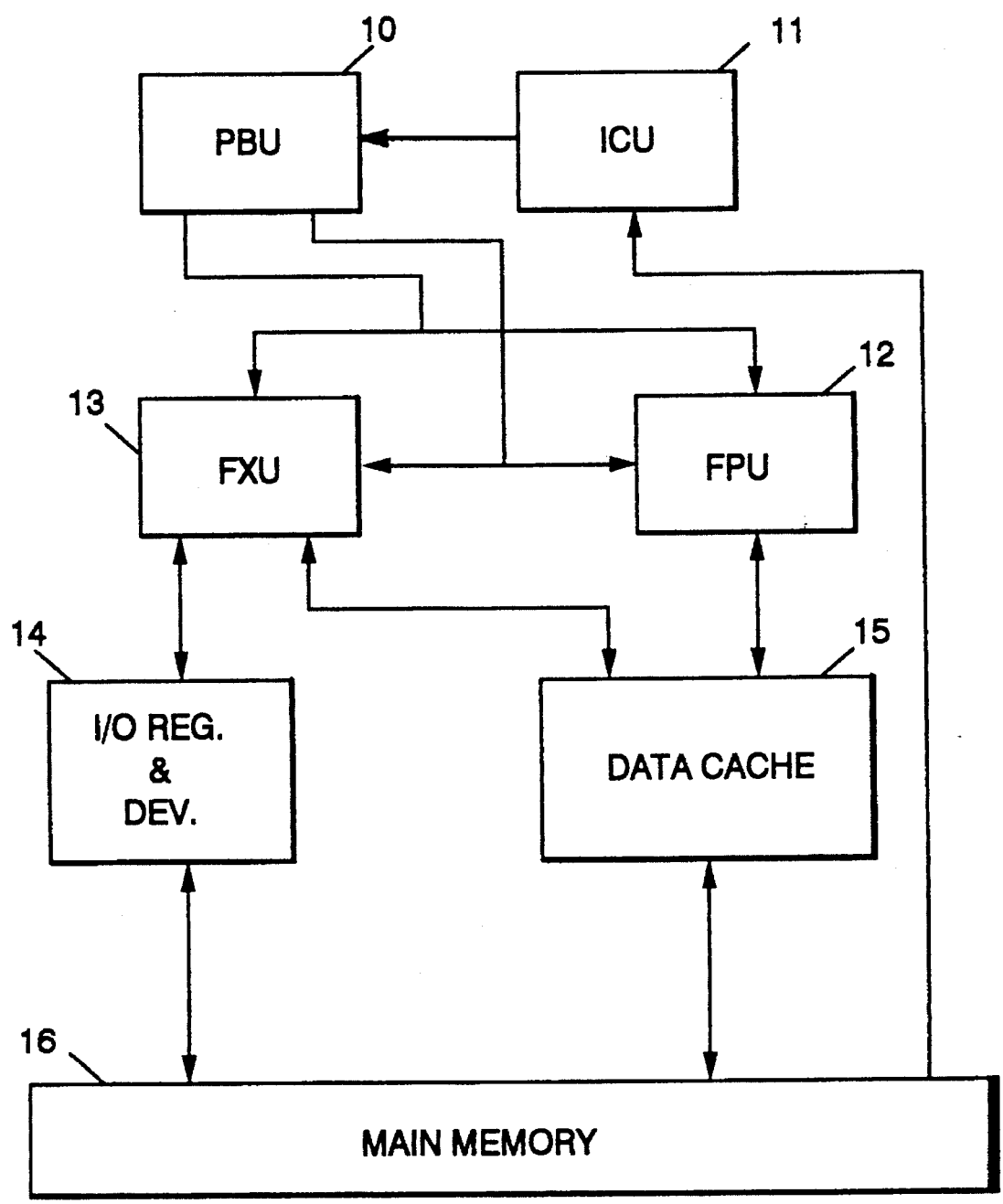
FIG. 1 is a schematic block diagram of the architecture of a RISC processor.

Referring to the drawing, and especially FIG. 1 thereof, which is a logical view of the RISC System/6000 architecture, in the accompanying FIG. (taken from Chapter 4 of *AIX Version 3.2 for RISC System/6000*, International Business Machines Corporation Publication #SC09-1705-00 and entitled "Optimization and Tuning Guide for FORTRAN, C, and C++"), instructions are sent from the main memory 16 to the Instruction Cache Unit (ICU 11). This is a small in size memory that supplies code to the Branch Processing Unit (BPU 10) at a significantly higher speed than if the BPU 10 were connected directly to the main memory 16. At the outset, it should be recognized that the RISC System/6000 processor contains three processing units, the Branch Processing Unit (BPU 10), the Fixed-Point Unit (FXU 13) and the Floating Point Unit (FPU 12), all of which are discussed briefly below. All three units can operate simultaneously.

The BPU 10 reads instructions from the ICU 11, is responsible for processing all instructions that transfer control to other locations in code, for dispatching non-branch instructions to the remaining two processing units, i.e., the FXU 13 and the FPU 12, and performs condition register logic. As is conventional, the FPU 12 performs floating point calculations on data items that have been loaded into floating-point registers and compare operations. The FXU 13 performs integer calculations, string manipulations, input and output (I/O) operations, logical and shift operations, real address generation for storage references, and other functions on data loaded into fixed point registers. The FXU 13 also performs load and store operations for both itself and the FPU 12.

For any FPU 12 or FXU 13 instruction that references a data item that is stored in memory, the FXU 13 translates the virtual address of that item into a real address. For floating point data, both the FXU 13 and FPU 12 are instrumental in loading and storing the contents of registers.

As is evident from the drawing, data is transferred through the data cache 15 between the processing units and the main memory 16. If an item of data is requested for an FPU 12 or FXU 13 register, and not already in the cache, a data cache 15 miss occurs. The processor loads the item, and adjacent items, from the Main Memory 16 into a line of the data cache 15. Depending upon the model RISC Processor employed, as well as the cache configuration, it is divided into lines which are 64, 128 or 256 bytes long. The time that the FXU 13 or FPU 12 must wait for the data to become available, if there is a data cache 15 miss, is 8–12 processor cycles. However, as long as a line of data remains in the cache, and the processor calls for that data, follow on data transfers between the processor registers and the data items contained in the cache line incur no delay.

In the event the cache lines are full (i.e., there is no cache line that can contain the data item), the processor flushes the contents of a used cache line out to main memory and replaces the existing line. If the contents of the cache line were not altered since they were read in, the old line will be discarded. (That is, because the cache line contents remain intact within the memory at the old or fetched from address.) However, the data cache 15 miss delay applies whether the processor flushes out a used cache line, discards a used cache line or the processor finds an empty cache line.

When the BPU 10 calls for a code location that is not already in the ICU 11, an instruction cache miss occurs. While this is similar to a data-cache-miss, there is no necessity of flushing the current contents of the instruction cache line prior to transferring new code in from main memory 16 because instructions are not changed. However, an instruction cache miss can cost up to 19 cycles on most implementations.

In order for the processor to read or write an item of data, such data (unless special provision is made) resides in physical memory. If a program size or data exceeds the capacity of main memory (RAM), provision is made to swap portions of the program or data between the main memory and the disk. This technique is known as "virtual memory" to increase the apparent size of the main memory. Every virtual memory computer system provides some technique by which a virtual address can be translated into a physical address to access physical or real memory. This is conventionally accomplished by dividing the virtual addressing space into "pages" or "frames", and providing a translation between an address designating a particular page or frame in the virtual address space, and the corresponding page or frame in physical or real memory. By way of background, the RISC System architecture implements a virtual memory addressing scheme that permits programs to reference a larger data area than there is actual memory. When a virtual memory location is chosen, the FXU 13 or BPU 10 determines the page or frame (4096 byte region) in which the item is contained. It searches through a Translation Lookaside Buffer (TLB) for an entry containing the page number. On most implementations, there are two sets of TLBs; a data TLB and an instruction TLB. If the page number is found in the appropriate TLB, the memory reference continues in a manner which is explained above with reference to the Data Cache 15 or if Code with reference to the Instruction Cache Unit (ICU 11).

In the event that a page or frame number is NOT located in the appropriate TLB, a processor delay occurs while it searches through a larger table called the Page Frame Table (PFT) for the referenced page. It discards the TLB entry for another page, loads the new page address into that TLB entry, and then the process starts all over again. Alternatively, if a TLB entry is unused, and therefore available, the processor does not discard the entry for an existing page already in the TLB.

This leaves one other possibility. If the processor cannot locate an entry for the referenced page in the PFT, a page fault occurs. The operating system (for example, AIX) is responsible for servicing page faults. The operating system attempts to locate an existing page of available real memory and if it locates one, it loads the referenced page into real memory and updates the PFT and TLB. The page is loaded from a device, such as a fixed disk, or is initialized by the operating system if the page is non-existent. In the event that no memory is available, the operating system may require the discarding of an unmodified page of real memory, or move a page to the fixed disk to make room for the newly-referenced page.

RISC SYSTEM/6000 MEMORY

Figure 2:
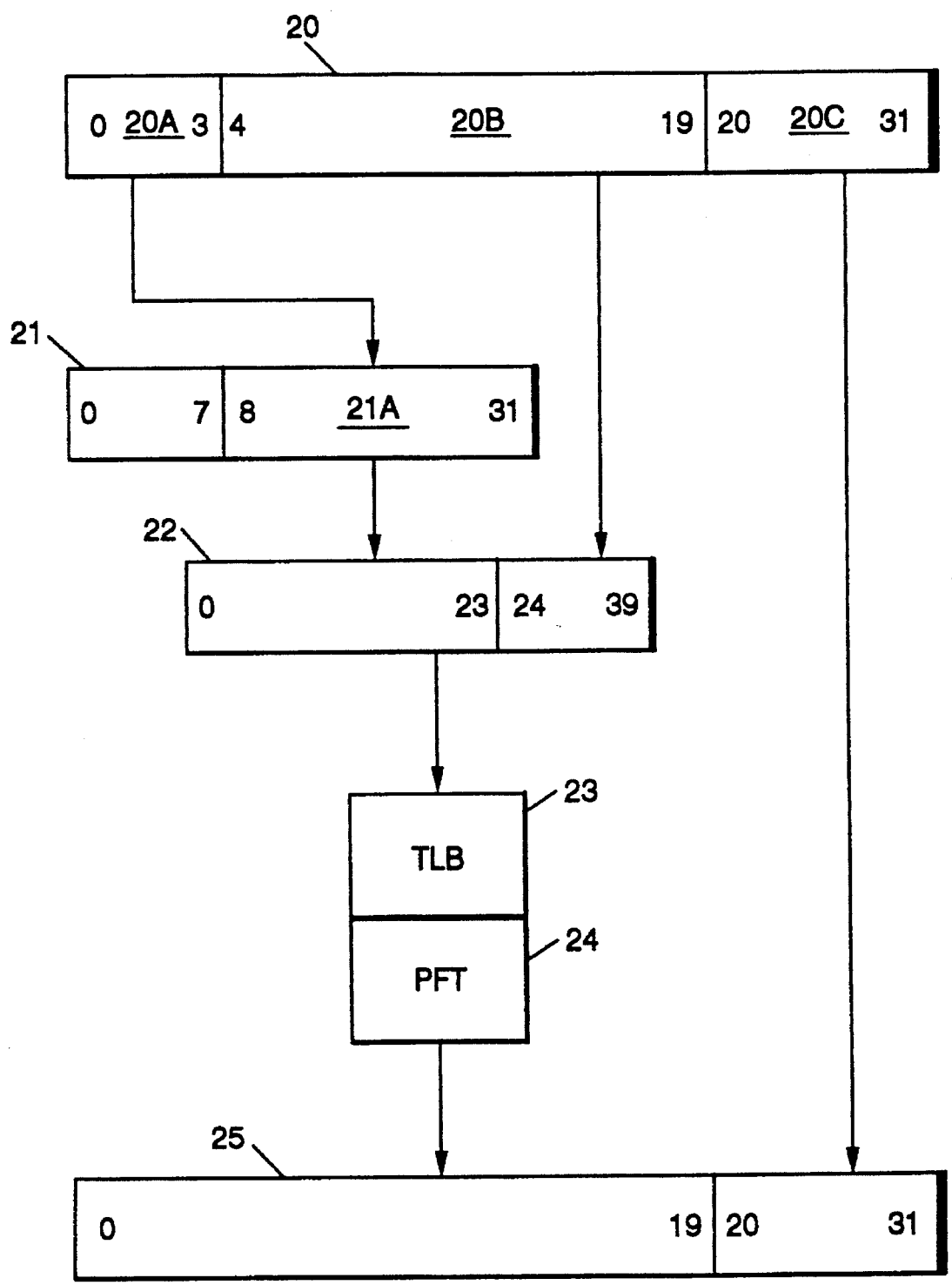
FIG. 2 is a schematic block diagram of virtual memory to physical memory address translation for the RISC processor illustrated in FIG. 1.

The architecture of the RISC System/6000 allows for direct addressing of 232 or 4 gigabytes of memory. Thus, in theory, a 32 bit address would allow a program to reference any location in real memory. But the RISC architecture allows addressing of virtual memory with a maximum of 252 or 4 petabytes. Because a 32 bit address is, of course, insufficient to directly address any 52 bit address in virtual memory, a virtual addressing technique is employed. This virtual addressing technique is best described with reference to FIG. 2, which graphically illustrates virtual address translation and generation. To map a 32 bit effective address 20 to a 52 bit virtual address, the processor looks at and takes the highest 4 bits 20a of the 32 bit address 20 to select one of 16 segment registers 21 (each of which is 32 bits) in the processor. The next 16 bits 20b of the 32 bit address 20 is concatenated with the low order 24 bits 21a of the selected segment register 22 of the segment registers 21. This gives a 40 bit-virtual page number, as shown in selected segment register 22. Theoretically, this means $2^{40}$ different page numbers.

The processor searches in the appropriate TLB 23 (code or data) for a match to the page address. The TLB 23 entries contain the page numbers of recently-referenced virtual memory pages which have been loaded into real main memory 16. In the event that a valid TLB 23 entry is uncovered, that entry is used. It includes a 20 bit real page number. This 20 bit page number is shifted left by 12 bits to yield the actual address of the start of the page in real memory. (As may be recalled, a page is $2^{12}$ or 4096 bytes in length.) The low order 12 bits 20c of the original effective address 20 are concatenated with the 20 bit real page number to give the 32 bit real address 25.

In the event that no valid TLB 23 entry is uncovered, a TLB 23 miss occurs, and the processor searches in the PFT 24 (Page Frame Table) for the page address. TLB misses cause a greater delay than cache misses, somewhere between 36 to 56 cycles. The reason for this is that a PFT lookup, as well as a cache miss, causes the delay.

Suppose that no valid page address is found in the PFT. A page fault interrupt is generated to the operating system (in the illustration, AIX). Page fault delays are orders of magnitude larger than cache or TLB miss delays because of operating system and I/O delays. By using a least-recently used (LRU) algorithm in the operating system to determine which page is to be replaced by the page being brought into real main memory 16, the 'overhead' of page faults is minimized. From the foregoing, it should be recognized that the most crucial performance issue in array-processing applications is memory use.

As has previously been explained, the data cache 15 is divided into lines that are typically 64, 128 or 256 bytes long. It would be inefficient to allow any memory location to map to any cache line because the processor would spend too much time in checking all cache lines either for an empty one or, if none open, for the least recently used. Cache implementations therefore restrict each real memory location to a small set of cache lines known as a congruence class. Set associativity means that a given memory location can only map to the cache lines within its congruence class or set. Most of the implementations of the data cache 15 in the RISC System/6000, are four-way set associative, meaning that four cache lines are available for a given memory location. Most implementation of the instruction cache are two way set associative.

THE INVENTION AND IT'S ENVIRONMENT

Figure 3:
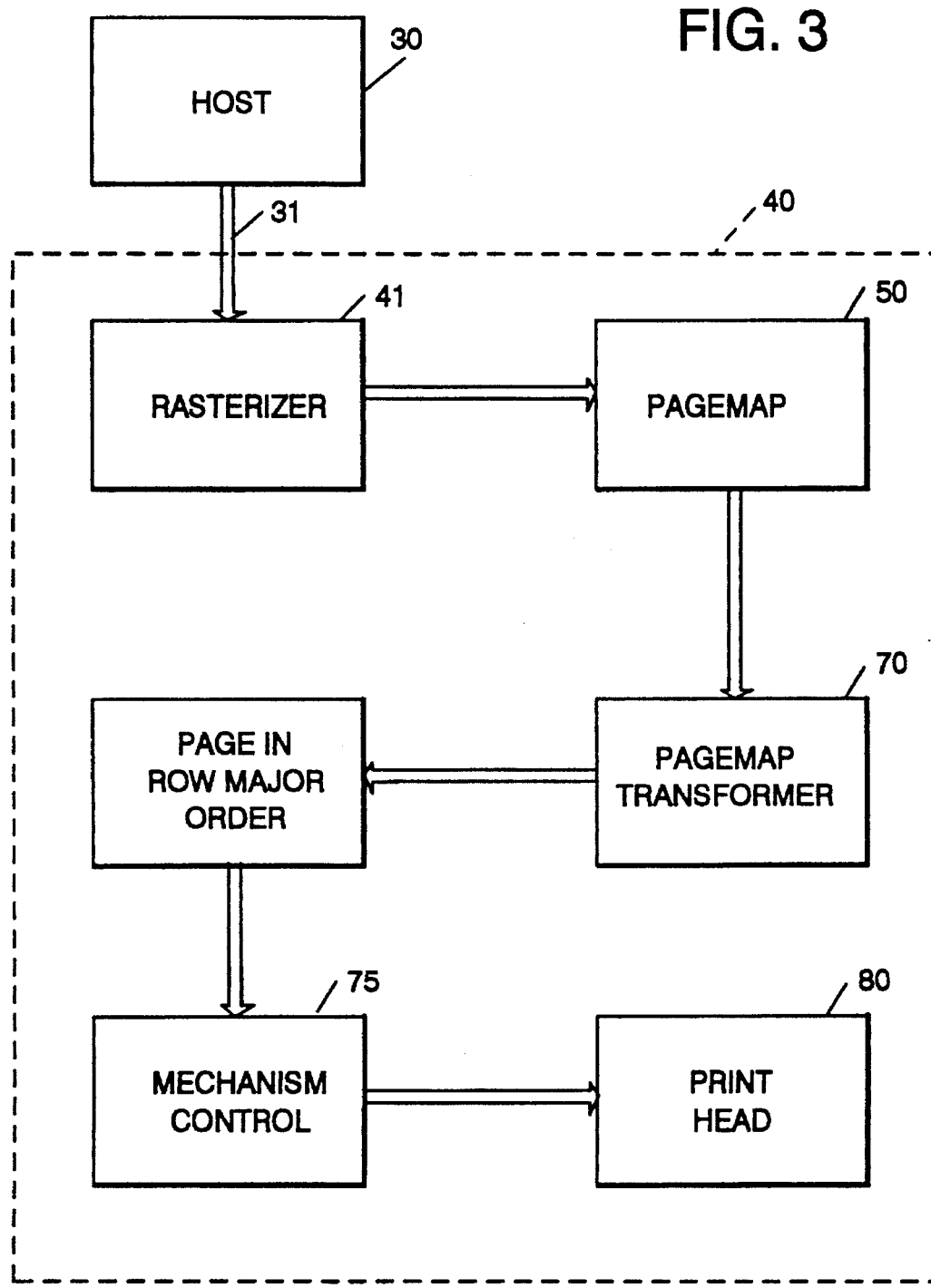
FIG. 3 is a block diagram of a printer connected to a host system, the printer employing the architecture and memory organization of the RISC processor shown in FIGS. 1 and 2, and utilizing the pagemap memory organization of the present invention.

Referring now to FIG. 3, a host 30 (which may be running an operating System, such as MVS or VM, including a print service facility called PSF (a system wide resource manager)), takes a "job" which has been formatted for a particular printer, and sends certain files, such as fonts, special commands and the like to the printer before sending the file to be printed. The host may comprise such hardware as AS 400's, PS/2's, RISC System/6000's, 3090's, etc., connected, as shown, to a printer 40 as by suitable cabling 31 (i.e., either serially or in parallel), or could be connected as by a LAN (e.g., a Token ring or ETHERNET or even through a modem employing SDLC). In the illustrated instance, the host is programmed to send a Page Description Language (PDL) called IPDS (Intelligent Print Data Stream) to the rasterizer 41 of the printer 40. However, other page description languages, such as "PostScript" or "PCL", are equally applicable. Such page description languages as "PostScript" or "PCL" are normally, but not always, associated with the low-end hosts, and the present invention is equally applicable to those languages. The PDL sets the format of the page to be printed (i.e., start at 1" down and 1" to the right of the upper left corner of the page) to the rasterizer 41, the rasterizer takes the description, interprets it, error checks it and actually builds the pagemap 50. The pagemap 50 is logically composed of a two-dimensional array of bits, sometimes referred to as a bitmap. The pagemap 50 is then serially sent to a "pagemap transformer" 70 which is a piece of code which rearranges the words in pagemap order from the pagemap 50 and transforms the words to a page in row major order, such as schematically illustrated at 71 in FIG. 3. It should be recognized that both of these representations are a two-dimensional array of bits, the row major order, though, is merely a different representation of the bits, in a more natural form for sending data to the printhead 80 through the printhead mechanism control 75. The printhead 80 wants to receive the words sent to it in a manner that allows it to print across the paper, just as the mechanism control 75 causes effective relative motion to occur between the printhead and the paper.

In accordance with the invention, the rasterizer 41 serves to arrange the pagemap 50 to optimize cache and TLB efficiency. To this end, and referring first to FIG. 4, a pagemap 50 constructed in accordance with the invention, is schematically shown therein. In the illustrated instance, the pagemap 50 is representative of a page 8.5 inches (21.59 cm) by 11 inches (27.94 cm) and is composed of a one-dimensional array of swaths. As shown in the drawing, each swath 50a is a two-dimensional array of words arranged in column major order. The height (number of scans) of each swath is limited in order that each virtual frame (or page) of memory spans several columns, 51, 52, 53, etc., of the pagemap 50. It should be noted that for ease of viewing and discussion, space is illustrated between the columns, but in the pagemap in memory, no such space exists. As has been explained heretofore, in the RISC System/6000 a frame (or page) is 4K bytes ($2^{12}$=4096 bytes), and every frame addressed requires a TLB entry. In the example, each swath 50a is 144 scans high (0 through 143). The rationale for making the swaths 144 scans high shall be explained more completely hereinafter. Assuming a word length of 32 bits or 4 bytes each, there are (4×144=576 bytes) for each swath height of 144 words. Thus, with 4K byte frames, each frame will comprise a little more than 7 columns. If the pagemap 50 width is as shown 8.5 inches (21.59 cm.), then 300 dots/inch×8.5 inches=2550 dots or bits divided by 32 bits/word=79~80 columns of 32 bit words. Thus, the number of frames required for each swath is 80 divided by 7, or approximately 11~12 TLB entries required to simultaneously address an entire swath. As previously explained, the example RISC System/6000 processor has at least 64 TLB entries. As a result, thrashing of TLB entries is precluded while processing data across the pagemap 50. Similarly, because of this arrangement, TLB entries don't thrash while processing data down the pagemap.

Figure 4:
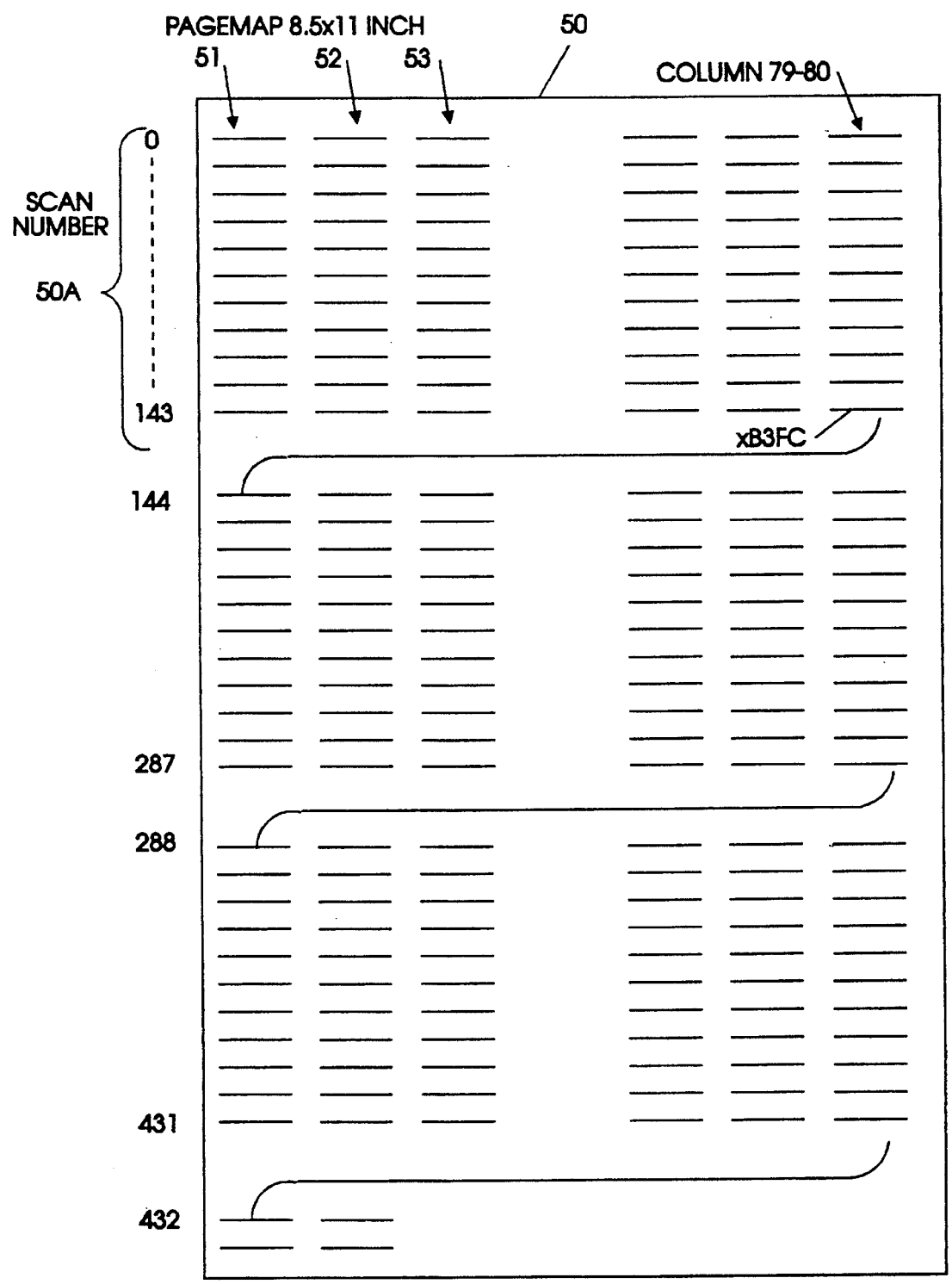
FIG. 4 is diagrammatic view of the pagemap memory organization of the present invention and illustrating the pagemap as being divided into a one-dimensional array of swaths.
Figure 5:
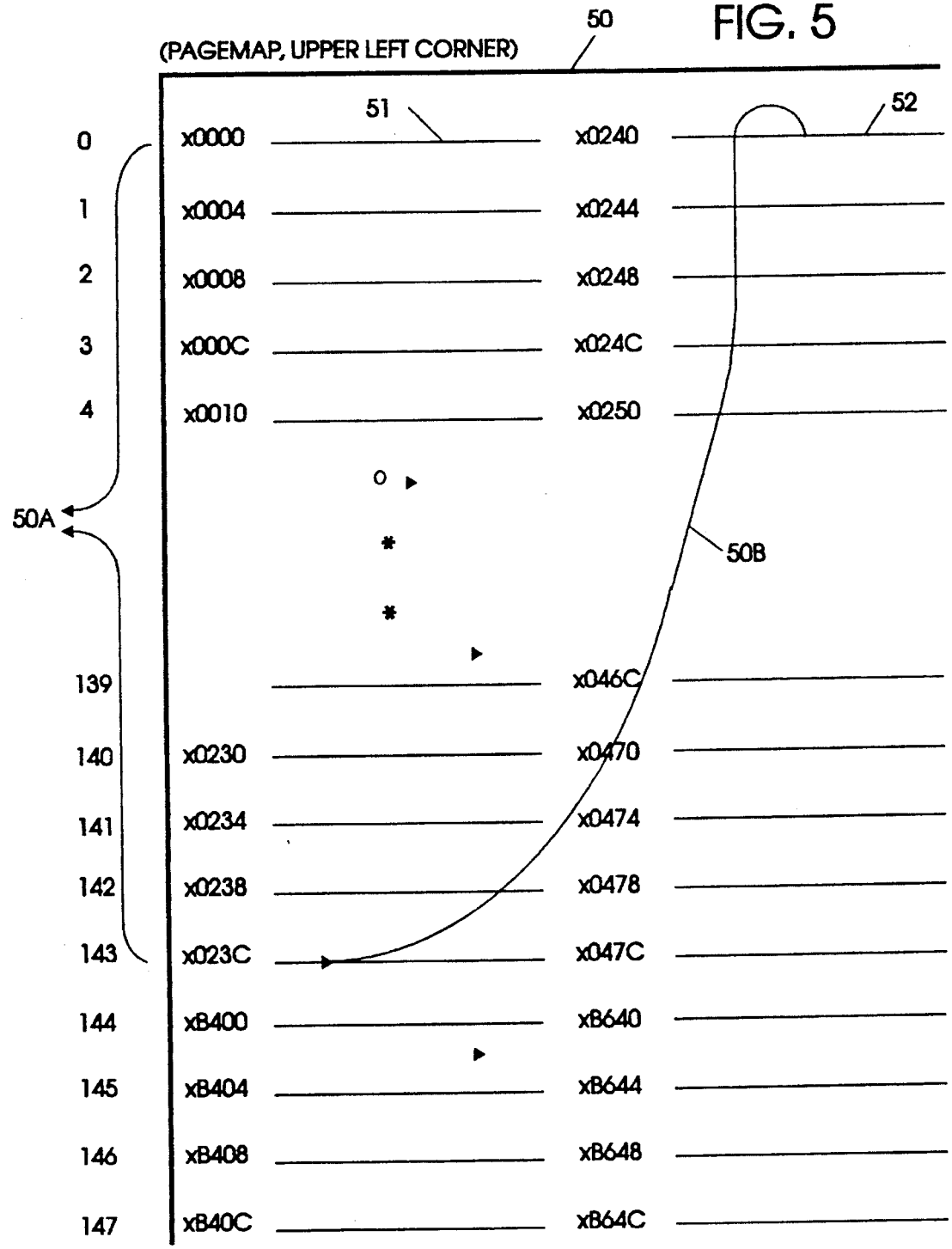
FIG. 5 is a fragmentary enlarged view of a portion of the top left corner of the pagemap of FIG. 4.

Some further discussion of the pagemap 50 is essential to the understanding of the present invention. Referring to FIG. 5, which is an enlarged schematic representation of the upper left corner of the pagemap 50, illustrated in FIG. 4, the starting address of the first word is assumed to be at 0000 hex. This is not normal, as the normal presentation of the pagemap would have an X and Y offset which would add a constant to the starting point. But assuming that the starting point of the first scan 0 is at the address x0000 (hex), and each word is 32 bits or 4 bytes in length (horizontal extent), then the starting address of the second scan is 4 bytes more or x0004 until the height of the swath 50a is reached; i.e., scan 143 (because numbering started at 0) which has a starting address of x023C. It should be noted that the next 4 byte address, (add 4 hex to x023C) or x240 starts at the top of the next column 52. But the scans are horizontal. This means that to the address of x0000, in order to scan into the first word of the second column, 240 hex (or 576 decimal)

must be added to the first address. This also means that adjacent words (horizontally) in adjacent columns of each swath may be located by simply adding 576 (240 hex) to the adjacent word starting address.

When the last word in scan 143 is addressed, its starting address will be 4 bytes less (or xB3FC) than the address xB400 at the beginning of scan 144. (This is illustrated in FIG. 4.) One other matter. As will be noted from the mathematics of the columns or frames, the last column of words calculates to be at 79 plus some remainder (with the sample 8.5×11 inch page). In order to come out even for the addresses in the column, the words in the last column (right side) are padded to the 32 bit boundary with zero bits. This makes calculation and actual handling of the data by the rasterizer 41 and the mechanism control 75 much easier.

From the discussion in the section of this application entitled "Background Of the Invention and Description of the Related Art" and the foregoing, it is evident that the optimal height of each swath is a function of the frame size, the data cache line size, and the set associativity of the data cache.

Moreover, from geometry, it is obvious that the geographical area covered by each frame is maximized if the boundaries form a square. For example, the number of bits in a 4K byte frame equals 4096*8=32768. The square root of 32768 is ~181. Thus, if a swath were 181 scans high, a frame would span~ 181 divided by 32 (bits/word)=5.7 columns of words in the horizontal (across the pagemap) direction. Accordingly, with 181 scans/swath, a 10 inch (25.4 cm) line across the pagemap would reference about the same number of frames as a 10 inch (25.4 cm) line going down the pagemap.

While 181 scan swaths are optimal for minimal TLB usage, it is not optimal for the data cache. The swath height is preferably an integral multiple of the number of words in a data cache line. Additionally, to ensure that all 'sets' of the cache are optimally utilized, the swath height (measured in number of scans) divided by the number of words in the data cache line should not divide evenly by two. This optimizes the utilization of the cache for either directly mapped or N-way set-associative caches. As an example, if the size of the data cache line is 16 words, then the optimal swath height is one of 16, 48, 80, 112, 144, 176, 208 etc. Alternatively, if the size of the data cache line is 32 words, then the optimal swath height is 32, 96, 160, 224, 288 etc. scans. Mathematically, this could be stated as follows:

$$H = n\ d$$

where:

H=Swath height in number of scans n=an odd integer d=data cache line size in words A reasonable compromise for good TLB usage and data cache usage for processors with a cache line size of 16 words is a swath height of 176 scans. If the processor utilizes a cache line size of 32 words, a swath height of 160 scans is reasonable.

Figure 6A:
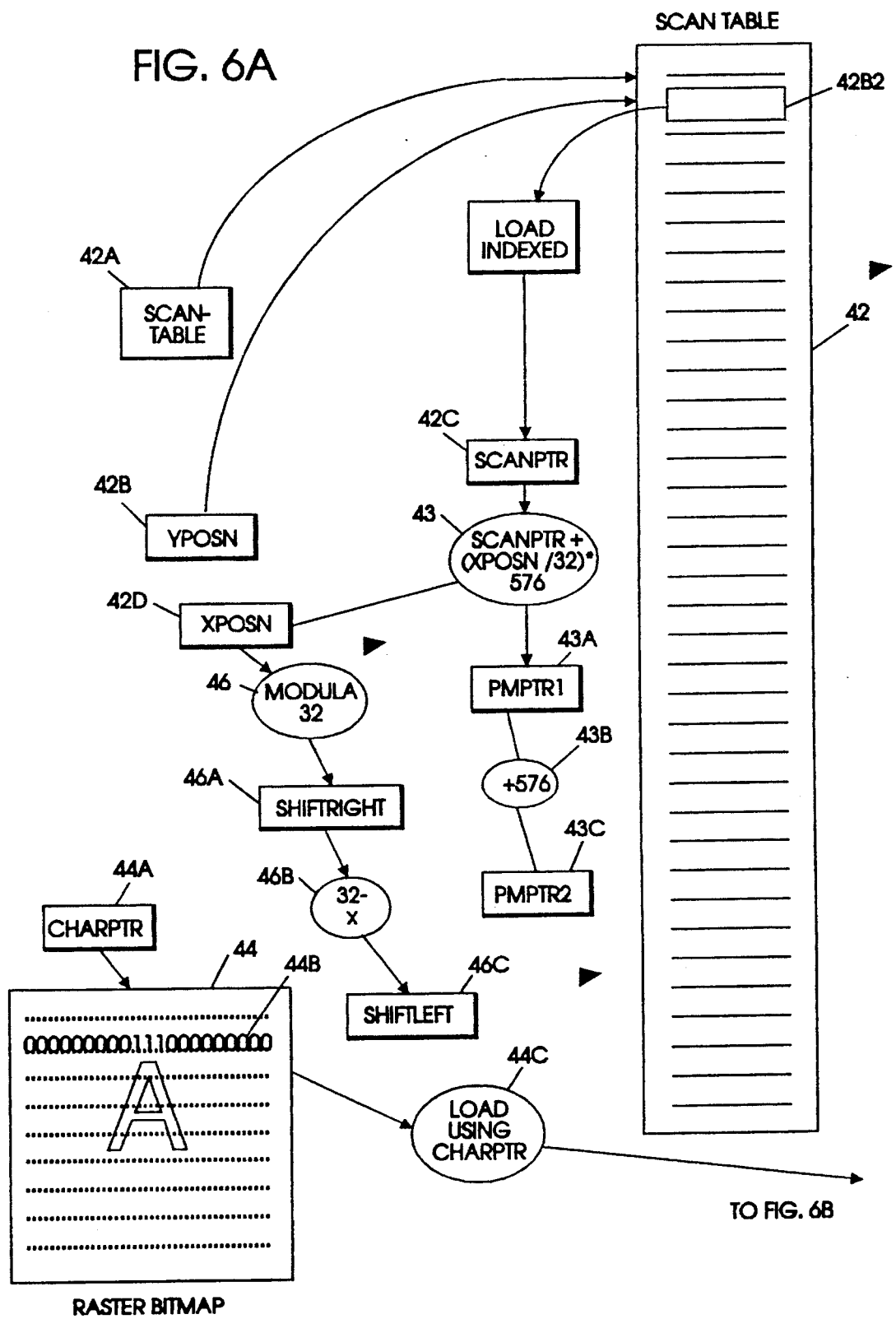
FIG. 6A and 6B are connected flowcharts exemplifying one way in which the optimization may be achieved.
Figure 6B:
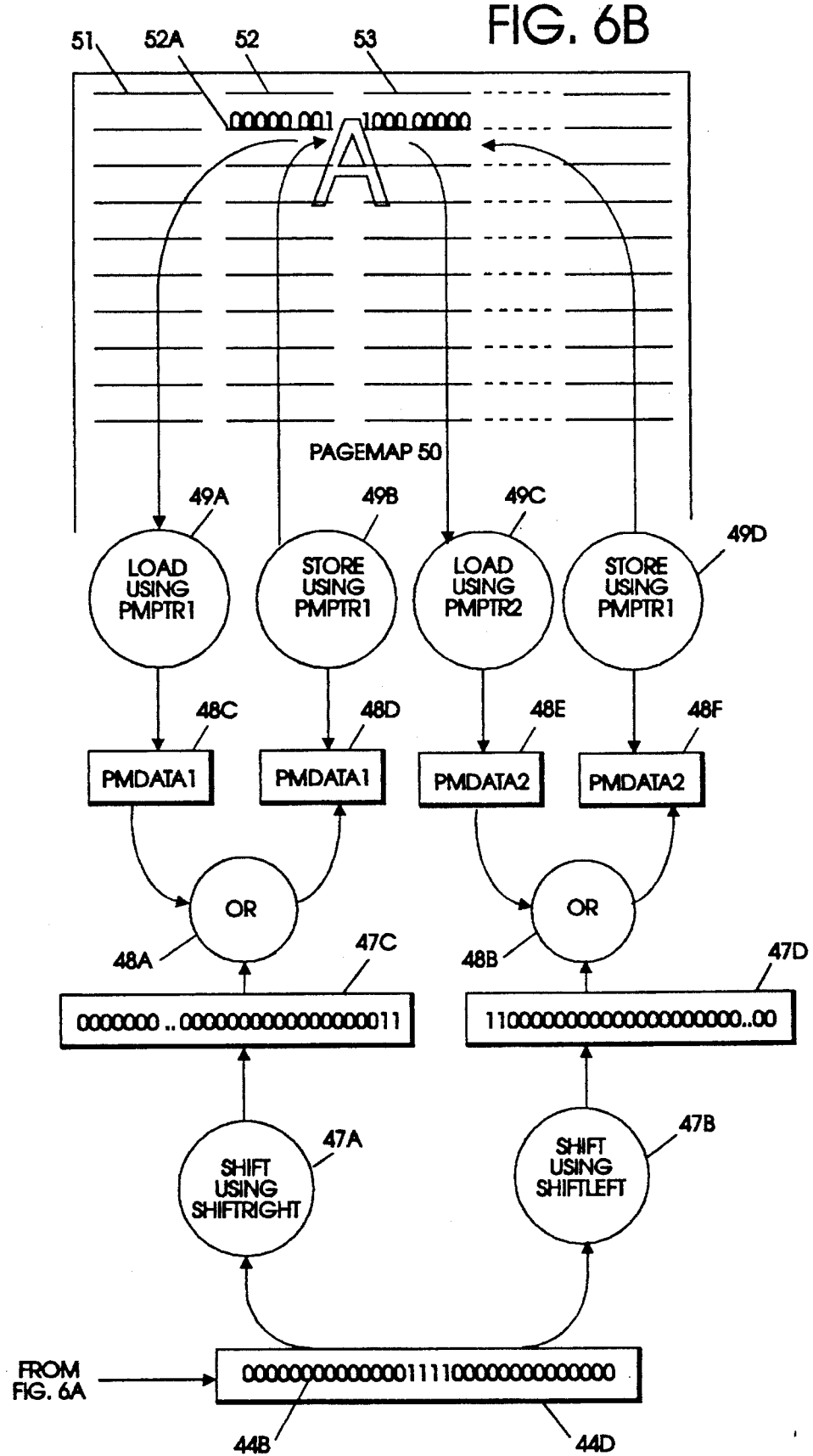

In accordance with the invention, the rasterizer 41 takes the PDL commands, e.g., use Helvetica as a font and place on the page map the letter "A" and start 1" down and 1" over, and make the letter 1" high etc., and places it on the pagemap in its predetermined place. With reference to FIGS. 6A and 6B, the rectangular boxes containing words such as "scanptr", "yposn", "xposn", "charptr", "pmptrl" etc., may all be considered separate 32 bit registers containing either addresses where a function or data is located or contains a value which is a result of some function. The circles or ovals represent a process or function to transform some value into something else. For example, the contents of "xposn" register 42d is fed into a function or oval 46 labeled "modula 32", which is a "C" programming language concept, which means divide the contents of register 42d "xposn" by 32 and send the remainder to register 46a labeled "shiftright".

Referring now to FIG. 6A, a scan table 42 includes a "scantable" pointer 42a which, in the example presentation, merely points to the beginning of the scan table 42. The scan table 42 is an array of addresses or pointers pointing to the starting point or word of each of the scans of bits or bit rows in the pagemap 50. In the scan table 42, there is a scan pointer to the beginning of each row. For example, the yposn pointer 42b is shown at the second row 42b2 of the scantable 42, to allow loading of the contents of the 2nd entry from the scantable 42 to permit load indexing of the y position contents and scanptr 42c for the calculation in logic box 43. The scantable 42 is created every time a pagemap 50 is allocated and resides in memory, as the pagemap, which also resides in memory, is created.

Referring to FIG. 6B and the pagemap 50, as set forth above, each horizontal line represents a 32 bit word or 4 bytes. Of course, it could represent other word lengths, but with the present illustration of a RISC type architecture, the word length is 32 bits. Assuming for example that what is being attempted is to place the letter "A" in the pagemap 50 at the location shown. Stored in FIG. 6A is the raster representation or bitmap 44 of the letter "A". This bitmap representation could be supplied in a number of different ways. For example, it could be resident in a font in the printer. It could be presented by way of the host, it could be a request from the host to take an outline font and generate it, or from any number of well known sources. Suffice at this point that it exists in any number of ways familiar to those skilled in the art. The bitmap 44 is composed of an array of 32 bit words, and charptr 44a is a pointer or register containing the starting address of the letter "A". Referring to the letter "A" in the pagemap 50, notice that the letter spans two columns, 52, 53 of the columns of words. Notice also that the raster bitmap 44 in FIG. 6A shows the letter "A" in a single column. The shiftright and shiftleft registers 46a, 46c contain the necessary bit numbers which correspond to the start position from the left of word column 52 and from the right of word column 53.

Referring to the raster bitmap 44, the word 44b at the apex of the "A" is truncated because of space requirements in the drawing, but in fact is 32 bits, the central 4 bits being represented by "1111", while the remainder, both left and right of the central position, being "0's". The word 44b is represented without truncation in FIG. 6B, having been loaded into a register 44d as by a function 44c "load using charptr" where the character pointer is "charptr" 44a.

The functions and how the various pointers and register contents are provided are best shown in FIGS. 6A and 6B. To this end, to calculate shift right such as contained in shiftright register 46a, (this is necessary, as may be recalled, because the letter "A" in the pagemap 50 straddles two columns 52, 53 with its apex between the two) the following must occur. Shiftright is merely the remainder of xposn 42d divided by 32, where xposn is the number of bits to position the raster bitmap from the left side of the pagemap 50. As an example, just looking at the pagemap, suppose the raster bitmap 44 is located 58 bits to the right from the left edge of the pagemap 50. The function "modula 32" in function 46, says divide 58 by 32 and store the remainder in register 46a labeled "shiftright". First, 58/32=1 with a remainder of 26. So binary number 26 will be stored in the register 46a "shiftright". This means that each scan, when placing the letter "A" in the pagemap 50, will have to be shifted to the right 26 bits. Shift left is calculated in the function 46b labeled "32-x", e.g., 32 minus the contents (26) of shiftright register 46a, in the present instance 6, which number may be stored in the "shiftleft" register 46c.

The next determination is where vertically in the pagemap is the letter "A" to be placed, i.e. which word in the pagemap do we have to modify or load. At this point the scan table 42 must be indexed into by the "yposn" register 42b (as an example, if the y position is 0 then it is the topmost scan in the pagemap, if 100, then it is down 100 words vertically, etc.). In essence, the leftmost address of the word where the letter "A" is to be placed must be located (see FIG. 5 for addresses x0000 to xB40C hex etc.). In the present instance, this is the starting address of the word 52a in FIG. 6B. This address is referred to in FIGS. 6A and 6B as "pmptr1" as in register 43a. The address is arrived at by the calculation in functional block 43; i.e., "scanptr+(xpoxn/32) * 576". Thus, if xposn was 58, dividing by 32 (integer division, not floating point) gives 1 with a remainder. That means we must go to the right from the left edge of the pagemap 50, one column, i.e., across column 51. By multiplying 1 times 576 (which is the decimal number of bytes to obtain the relative address of the adjacent word in a scan to the right, [240 hex], with a scan height of 144) and then adding the "scanptr" register 42c contents, gives the starting address of the word 52a which is the start of the first word in which the top of the "A" is mapped.

Once the starting address of the word 52a is found, it is a simple matter to add 576 (240 hex) to that address, as shown in FIG. 6A at function block 43b, to arrive at the starting address for the next adjacent word loaded into and designated 43c in register "pmptr2". It is obvious that if the raster bitmap 44a for the letter "A" is 12 scans high, then the above description would have to be looped (not shown) 12 times to insure placement of the entire letter in the pagemap 50. Moreover, the values for "shiftleft" and "shiftright" only has to be done for the first scan of the letter "A", and can be moved outside of the loop for the remainder of the loading and placement of the letter "A" in the pagemap 50.

In the event that the raster bitmap 44a encompasses more than one word in width, for example with a "W" that is to be 60 points, the same principles hold. What would be required is more loops or iterations of the fundamental parts shown in FIGS. 6A and 6B.

Referring now to FIG. 6B, the binary representation, i.e., 32 bits, of the word 44b is shown therein in register 44d. The functional blocks "shift using shiftright" 47a and "shift using shiftleft" 47b effectively split the word 44b, shifting one-half of it to the right and padding the remainder with zero's as shown in register 47c and simultaneously doing the same thing with the right hand portion of the word 44b, except shifting left and padding the right as shown in register 47d. As shown, the contents of the registers are then fed into OR functions 48c and 48d, respectively.

Assuming that the pagemap 50 contained all 0's, or was empty before starting the process of building the "A" onto the pagemap, the first step is to load into register 48c, "pmdata1" using "pmptr1" from register 43a the existing contents of the then existing word at word 52a and the next horizontally adjacent word using the contents of register 43c "pmptr2" into register 48e "pmdata2". When the contents of the registers 47c and 48c are OR'ed as by OR function 48a, and the contents of register 47d and 48e are OR'ed as by OR function 48b, the word 44b in register 44d will be replicated. This occurs because the output of OR function 48a is placed in register 48d and then stored using the value of pmptr1 (through function block 49b) into the word 52a in column 52 of the pagemap 50. Similarly, the output of OR function 48b is applied to register 48f "pmdata2" and then through functional block 49d "store using pmptr2" into the next adjacent word in column 53. As may be imagined, if there were other letters or indicia adjacent the "A", the OR process would keep it there; i.e., it would remain on the pagemap.

When the pagemap 50 contains sufficient data to permit printing thereof, the memory is addressed by scans, loading each word in a horizontal scan and addressing the next adjacent word merely by adding 240 hex or 576 decimal to the original starting address thereby automatically transforming the pagemap to row major order for printing.

Thus, the present invention optimizes pagemap organization in memory to thereby minimize loss of efficiency in printers employing advanced state of the art processors, e.g., RISC processors having data caches, table lookaside buffers and virtual memory.

Although the invention has been described with a certain degree of particularity, it should be recognized that elements thereof may be altered by person(s) skilled in the art with out departing from the spirit and scope of the invention as hereinafter set forth in the following claims.

What is claimed is:

1. A method of optimizing pagemaps in computer memory to minimize losses in efficiency of processing with processors having data caches, TLB's and virtual memory, the loss in efficiency due to unavailability of desired data in first the data cache, then the random access memory; a plurality of table lookaside buffers associated with the processor, each table lookaside buffer containing the address of a frame of memory, each frame comprising a finite number of bytes of data; comprising the steps of:

(1) dividing the pagemap into one dimensional array of swaths of scans, each swath containing a two dimensional array of words in column major order;

(2) each of said swaths having a height measured in scans which is an integral multiple of the number of words in a data cache line; and (3) printing the pagemap by providing the output of the processor to a print head.

2. A method of optimizing pagemaps in memory to minimize losses in processor efficiency in accordance with claim 1 including the step of optimizing set associativity of data cache line utilization by determining that the swath height divided by the number of words in a data cache line are not evenly divided by two.

3. A method of optimizing pagemaps in memory to minimize losses in processor efficiency in accordance with claims 1 or 2 including the step of transforming the output of said pagemap from memory into row major order.

4. A method of optimizing pagemaps in memory to minimize losses in processor efficiency wherein said processor comprises a reduced instruction set processor and in accordance with claim 1, including the step of rasterizing into scans information received from a host processor.

5. A method of optimizing pagemaps in computer memory to minimize losses in efficiency of processing with processors having data caches, TLB's and virtual memory, the loss in efficiency due to unavailability of desired data in first the data cache, then the random access memory; a plurality of table lookaside buffers associated with the processor, each table lookaside buffer containing the address of a frame of memory, each frame comprising a finite number of bytes of data; comprising the steps of:

(1) dividing the pagemap into one dimensional array of swaths of scans, each swath containing a two dimensional array of words in column major order;

(2) each of said swaths having a height measured in scans which is a function of frame size, data cache line size and set associativity of said data cache; and (3) printing the pagemap by providing the output of the processor to a print head.

6. A method of optimizing pagemaps in computer memory to minimize losses in efficiency of processing in accordance with claim 5, including the step of providing the number of scans in each of said swaths equal to an integral multiple of the number of words in a data cache line.

7. A method of optimizing pagemaps in memory to minimize losses in processor efficiency wherein said processor comprises a reduced instruction set processor, and in accordance with claim 6, including the step of rasterizing into scans information received from a host processor desired for printing.

8. A method of optimizing pagemaps in memory to minimize losses in processor efficiency in accordance with claim 7 including the step of transforming the output of said rasterizing step into row major order.

9. A method of optimizing pagemaps in memory to minimize losses in processor efficiency in accordance with claim 5 including the step of optimizing set associativity of data cache line utilization by determining that the swath height divided by the number of words in a data cache line are not evenly divided by two.

10. A printer including a processor for receiving, and operating upon a stream of data and reforming the data to be printed into a pagemap to minimize losses in efficiency of processing, said processor including random access main memory, at least a data cache, virtual memory and a plurality of table lookaside buffers associated with the processor, each table lookaside buffer containing the address of a frame of memory, each frame comprising a finite number of bytes of data; said loss in efficiency due to unavailability of desired data in first the data cache, then the random access memory; means for dividing the pagemap into one dimensional array of swaths of scans, each swath containing a two dimensional array of words in column major order; each of said swaths having a height measured in scans which is an integral multiple of the number of words in a data cache line, and print head means for printing the pagemap.

11. A printer including a processor for receiving, and operating upon a stream of data and reforming the data to be printed into a pagemap to minimize losses in efficiency of processing when printing in accordance with claim 10 including means for optimizing set associativity of data cache line utilization by determining that the swath height divided by the number of words in a data cache line are not evenly divided by two.

12. A printer including a processor for receiving, and operating upon a stream of data and reforming the data to be printed into a pagemap to minimize losses in efficiency of processing when printing, in accordance with claim 10, including pagemap transformer means for transforming the output of said pagemap from memory into row major order.

13. A printer including a processor for receiving, and operating upon a stream of data and reforming the data to be printed into a pagemap to minimize losses in efficiency of processing when printing, in accordance with claim 11, including pagemap transformer means for transforming the output of said pagemap from memory into row major order.

14. A printer including a processor for receiving, and operating upon a stream of data and reforming the data to be printed into a pagemap to minimize losses in efficiency of processing when printing, in accordance with claim 10 or 11 or 12, wherein said processor comprises a reduced instruction set processor.

15. Apparatus for optimizing pagemaps in computer memory to minimize losses in efficiency of processing with processors having data caches and virtual memory, the loss in efficiency due to unavailability of desired data in first the data cache, then the random access memory; a plurality of table lookaside buffers associated with the processor, each table lookaside buffer containing the address of a frame of memory, each frame comprising a finite number of bytes of data:

(1) means for dividing the pagemap into one dimensional array of swaths of scans, each swath containing a two dimensional array of words in column major order;

(2) each of said swaths having a height measured in scans which is an integral multiple of the number of words in a data cache line; and (3) print head means for receiving the output of the processor for printing the pagemap.

16. Apparatus for optimizing pagemaps in computer memory to minimize losses in efficiency of processing in accordance with claim 15 including means for determining that the swath height divided by the number of words in a data cache line are not evenly divided by two and thereby optimizing set associativity of data cache line utilization.

17. Apparatus for optimizing pagemaps in computer memory to minimize losses in efficiency of processing in accordance with claim 16 including pagemap transformer means for transforming the output of said pagemap from memory into row major order.

18. Apparatus for optimizing pagemaps in computer memory to minimize losses in efficiency of processing in accordance with claim 17 wherein said processor comprises a reduced instruction set processor.

19. Apparatus for optimizing pagemaps in computer memory to minimize losses in efficiency of processing in accordance with claim 17 including means for providing the number of scans in each of said swaths equal to an integral multiple of the number of words in a data cache line.

20. Apparatus for optimizing pagemaps in computer memory to minimize losses in efficiency of processing in accordance with claim 15 wherein said processor comprises a reduced instruction set processor; a host computer and means for rasterizing into scans information received from said host computer.

21. A printing system comprising a host computer for sending commands and data in a predetermined format as specified by at least the operating system of the computer, to a printer; said printer including a processor for receiving, and operating upon a stream of data and reforming the data to be printed into a pagemap to minimize losses in efficiency of processing, said processor including random access main memory, at least a data cache, virtual memory and a plurality of table lookaside buffers associated with the processor, each table lookaside buffer containing the address of a frame of memory, each frame comprising a finite number of bytes of data; said loss in efficiency due to unavailability of desired data in first the data cache, then the random access memory; means for dividing the pagemap into one dimensional array of swaths of scans, each swath containing a two dimensional array of words in column major order; each of said swaths having a height measured in scans which is a function of frame size, data cache line size and set associativity of said data cache; and print head means for printing the pagemap.

22. A printing system in accordance with claim 21 wherein each of said swaths has a height measured in scans which is an integral multiple of the number of words in a data cache line.

* * * * *